US012313229B1

(12) United States Patent
Liu

(10) Patent No.: US 12,313,229 B1
(45) Date of Patent: May 27, 2025

(54) WATER-STIRRING LANTERN

(71) Applicant: HUIZHOU VICTORY TECHNOLOGY LTD., Huizhou (CN)

(72) Inventor: Hesheng Liu, Huaihua (CN)

(73) Assignee: HUIZHOU VICTORY TECHNOLOGY LTD., Huizhou (CN)

( * ) Notice: Subject to any disclaimer, the term of this patent is extended or adjusted under 35 U.S.C. 154(b) by 0 days.

(21) Appl. No.: 18/761,306

(22) Filed: Jul. 2, 2024

(51) Int. Cl.
*F21S 10/00* (2006.01)

(52) U.S. Cl.
CPC .................................. *F21S 10/002* (2013.01)

(58) Field of Classification Search
None
See application file for complete search history.

(56) References Cited

U.S. PATENT DOCUMENTS 2,741,693 A * 4/1956 Fasson ............... A47G 33/0836 40/406
6,746,131 B1 * 6/2004 Goldstein ............. F21S 10/002 362/86
11,079,083 B1 * 8/2021 Yang ....................... G09F 13/34

FOREIGN PATENT DOCUMENTS

WO WO-2006045386 A1 * 5/2006 ............ F21S 10/002

* cited by examiner

*Primary Examiner* — Mariceli Santiago
(74) *Attorney, Agent, or Firm* — Justin Lampel

(57) ABSTRACT

A water-stirring lantern related to a technical field of water-stirring lanterns and includes a bottle body. A sealing cover is installed on a bottom end of the bottle body. A first groove is defined in the bottom end of the sealing cover. A driving assembly is installed in the first groove. The driving assembly is disposed in a sleeve. A water outlet pipe is installed on one side of the sleeve. A fixed bottom support base is fixedly installed on an upper end of the sleeve. Protruding blocks around a notch portion of the bottom end of the bottle body are respectively snapped in snapping grooves of the sealing cover, which facilitates assembly and disassembly of the bottle body and the sealing cover. Water-stirring blades are installed on a sleeving piece, and the water-stirring blades are disposed on the driving shaft and driven by the driving motor.

8 Claims, 3 Drawing Sheets

WATER-STIRRING LANTERN

TECHNICAL FIELD

The present disclosure relates to a technical field of water-stirring lanterns, and in particular to a water-stirring lantern capable of freely changing a water flow direction therein.

BACKGROUND

With rapid development of economy and continuous improvement of people's living standards, in order to create a festive atmosphere, people commonly install various decorative lights in various places. Taking Christmas, New Year's Day, Spring Festival as examples, people often use snowflake-shaped decorative lights to shape a winter scene, thereby creating a happy and peaceful festive atmosphere. However, conventional snowflake-shaped decorative lights are generally flat. Due to limitations of a flat shape itself, the conventional decorative lights are unable to perfectly express an unique three-dimensional effect of a snowflake, making the conventional decorative lights look quite monotonous, dull, and lacking in three-dimensional sense.

Moreover, most of the conventional decorative lights are fixed and are unable to be rotated, resulting in poor Artistic appreciation. In addition, a conventional decorative light is commonly completely disposed in a bottle body and is unable to be disassembled and assembled effectively and quickly. Therefore, it is necessary to provide a water-stirring lantern capable of freely changing a water flow direction therein to solve the problems.

SUMMARY

A purpose of the present disclosure is to provides a water-stirring lantern capable of freely changing a water flow direction therein to solve problems in the prior art.

To realize the above purpose, the present disclosure provides the water-stirring lantern capable of freely changing the water flow direction therein. The water-stirring lantern comprises a bottle body. A sealing cover is installed on a bottom end of the bottle body. A first groove is defined in the bottom end of the sealing cover. A driving assembly is installed in the first groove. The driving assembly is disposed in a sleeve. A water outlet pipe is installed on one side of the sleeve. A fixed bottom support base is fixedly installed on an upper end of the sleeve. A connecting block is installed on an upper end of the fixed bottom support base. A first snowflake rotating piece and a second snowflake rotating piece are respectively installed at two side ends of the connecting block.

In one optional embodiment, the driving assembly comprises a driving motor. A driving shaft is installed on an output end of the driving motor. A sleeving piece is installed on the driving shaft. Water-stirring blades are installed on the sleeving piece.

In one optional embodiment, a through hole is defined in a middle portion of the sleeving piece. The driving shaft passes through the through hole. A second groove is defined in the sleeving piece. A gasket is installed in the second groove. The sleeving piece is sleeved in the sealing cover.

In one optional embodiment, connecting shafts are fixedly installed on the two side ends of the connecting block. Limiting blocks are respectively fixedly installed on the connecting shafts. Mounting holes are respectively defined in the first snowflake rotating piece and the second snowflake rotating piece. A first connecting shaft passes through a first mounting hole in the first snowflake rotating piece. A second connecting shaft passes through a second through hole in the second snowflake rotating piece.

In one optional embodiment, inserting grooves are defined in the sealing cover. Inserting rods are fixedly installed on two side ends of a bottom end of the fixed bottom support base. The inserting rods are respectively inserted into the inserting grooves in the sealing cover.

In one optional embodiment, the water outlet pipe is communicated with the sleeve. One end of the water outlet pipe away from the sleeve defines a water outlet. The water outlet is communicated with an interior of the bottle body.

In one optional embodiment, a notch portion is defined on the bottom end of the bottle body. Protruding blocks are circumferentially disposed around the notch portion. Snapping grooves are circumferentially defined in the sealing cover. The protruding blocks around the notch portion are respectively snapped in the snapping grooves of the sealing cover.

In one optional embodiment, a water inlet is defined in the bottom end of the sealing cover, and the water inlet is communicated with the bottle body.

Compared with the prior art, in the present disclosure, the water-stirring lantern is capable of freely changing the water flow direction therein. The protruding blocks around the notch portion of the bottom end of the bottle body are respectively snapped in the snapping grooves of the sealing cover, which facilitates assembly and disassembly of the bottle body and the sealing cover. The water-stirring blades are installed on the sleeving piece, and the water-stirring blades are disposed on the driving shaft and driven by the driving motor, thereby realizing a rotation of the water-stirring blades. Water in the sleeve is stirred by the water-stirring blades to change the water flow direction, thereby realizing rotations of the first snowflake rotating piece and the second snowflake rotating piece, making the water-stirring lantern more ornamental.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

In the drawings.

1—bottle body; 2—notch portion; 3—protruding block 4—sealing cover; 5—snapping groove; 6—inserting rod; 7—inserting groove; 8—water inlet; 9—sleeve; 10—water outlet pipe; 11—water outlet; 12—fixed bottom support base; 13—first snowflake rotating piece; 14—first groove; 15—driving motor; 16—driving shaft; 17—through hole; 18—sleeving piece

19—water-stirring blade; 20—second groove; 21—gasket; 22—connecting block; 23—connecting shaft; 24—limiting block; 25—second snowflake rotating piece; 26—mounting hole.

DETAILED DESCRIPTION

The present disclosure is further described below in conjunction with the accompanying drawings and specific embodiments.

Embodiment 1

Figure 1:
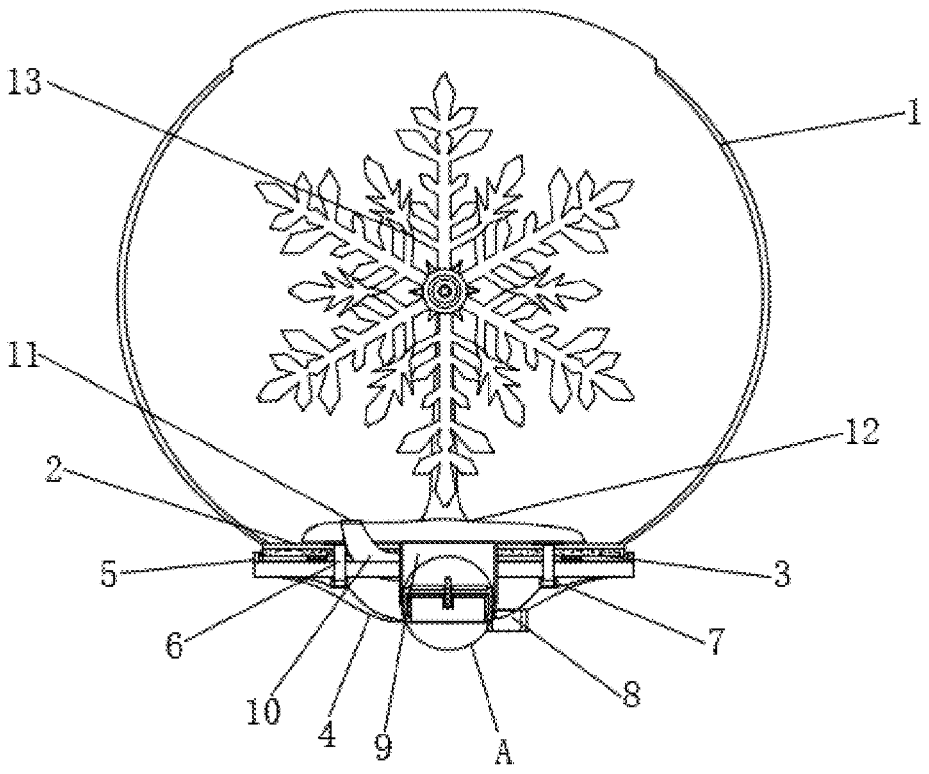
FIG. 1 is a structural schematic diagram of a water-stirring lantern capable of freely changing a water flow direction therein according to one embodiment of the present disclosure.
Figure 3:
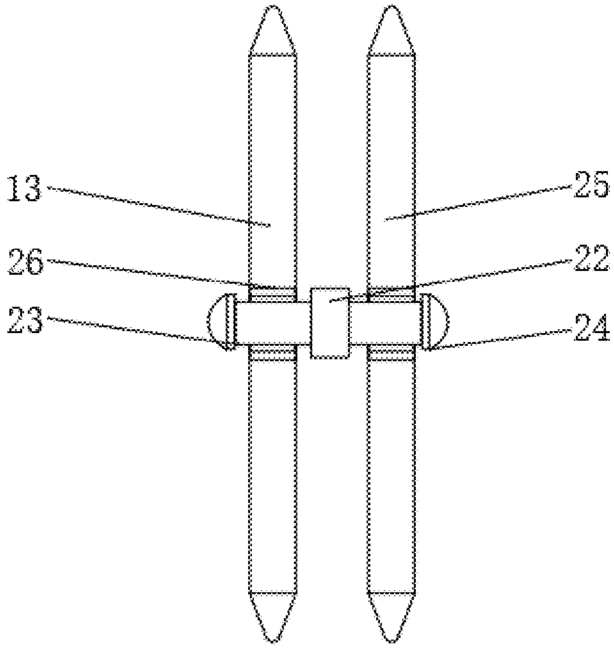
FIG. 3 is a structural schematic diagram of snowflake pieces of the water-stirring lantern capable of freely changing the water flow direction therein according to one embodiment of the present disclosure.

As shown in FIGS. 1 and 3, the present disclosure provides a water-stirring lantern capable of freely changing a water flow direction therein. The water-stirring lantern comprises a bottle body 1. A sealing cover 4 is installed on a bottom end of the bottle body 1. A first groove 14 is defined in the bottom end of the sealing cover 4. A driving 15 assembly is installed in the first groove 14. The driving assembly is disposed in a sleeve 9. A water outlet pipe 10 is installed on one side of the sleeve 9. A fixed bottom support base 12 is fixedly installed on an upper end of the sleeve 9. A connecting block 22 is installed on an upper end of the fixed bottom support base 12. A first snowflake rotating piece 13 and a second snowflake rotating piece 25 are respectively installed at two side ends of the connecting block 22. Connecting shafts 23 are fixedly installed on the two side ends of the connecting block 22. Limiting blocks 24 are respectively fixedly installed on the connecting shafts 23. Mounting holes 26 are respectively defined in the first snowflake rotating piece 13 and the second snowflake rotating piece 25. A first connecting shaft passes through a first mounting hole in the first snowflake rotating piece 13. A second connecting shaft passes through a second through hole 17 in the second snowflake rotating piece 25.

Inserting grooves 7 are defined in the sealing cover 4. Inserting rods 6 are fixedly installed on two side ends of a bottom end of the fixed bottom support base 12. The inserting rods 6 are respectively inserted into the inserting grooves 7 in the sealing cover 4.

The water outlet pipe 10 is communicated with the sleeve 9. One end of the water outlet pipe 10 away from the sleeve 9 defines a water outlet 11. The water outlet 11 is communicated with an interior of the bottle body 1.

A notch portion 2 is defined on the bottom end of the bottle body 1. Protruding blocks 3 are circumferentially disposed around the notch portion 2. Snapping grooves 5 are circumferentially defined in the sealing cover 4. The protruding blocks 3 around the notch portion 2 are respectively snapped in the snapping grooves 5 of the sealing cover 4. A water inlet 8 is defined in the bottom end of the sealing cover 4, and the water inlet 8 is communicated with the bottle body 1.

In the embodiment, the protruding blocks 3 around the notch portion 2 of the bottom end of the bottle body 1 are respectively snapped in the snapping grooves 5 of the sealing cover 4, which facilitates assembly and disassembly of the bottle body 1 and the sealing cover 4.

Embodiment 2

Figure 2:
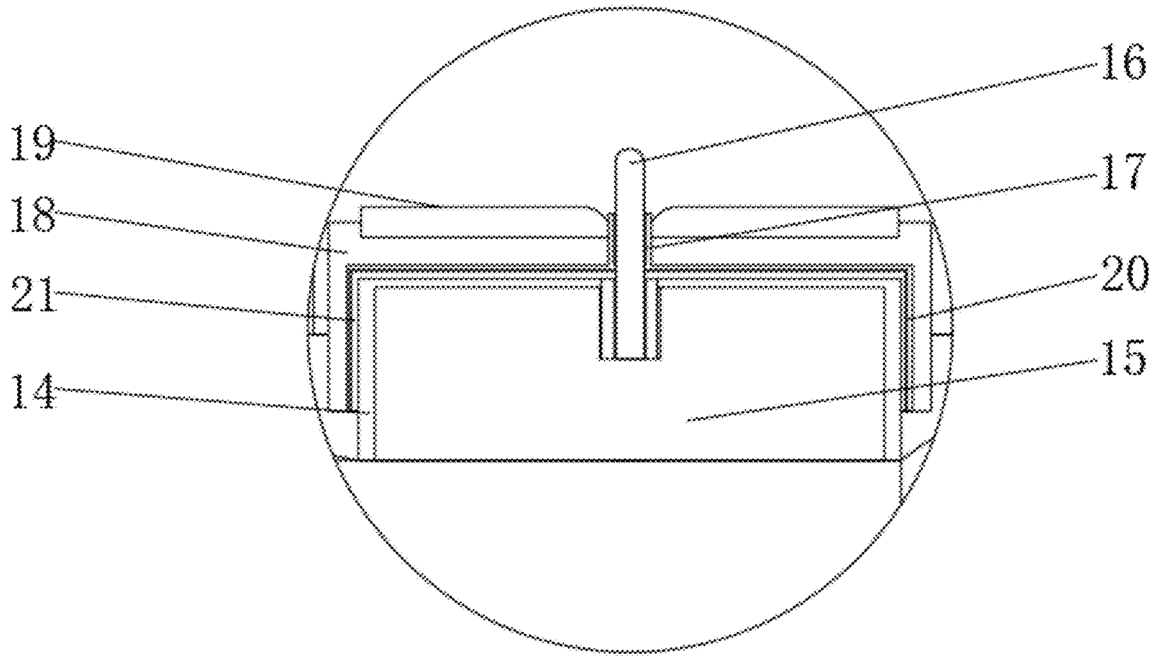
FIG. 2 is an enlarged schematic diagram of portion A shown in FIG. 1.

As shown in FIG. 2, the embodiment further illustrate the water-stirring lantern of Embodiment 1. The driving assembly comprises a driving motor 15. A driving shaft 16 is installed on an output end of the driving motor 15. A sleeving piece 18 is installed on the driving shaft 16. Water-stirring blades 19 are installed on the sleeving piece 18. A through hole 17 is defined in a middle portion of the sleeving piece 18. The driving shaft 16 passes through the through hole 17. A second groove 20 is defined in the sleeving piece 18. A gasket 21 is installed in the second groove 20. The sleeving piece 18 is sleeved in the sealing cover 4.

In the embodiment, the water-stirring blades 19 are installed on the sleeving piece 18, and the water-stirring blades 19 are disposed on the driving shaft 16 and driven by the driving motor 15, thereby realizing a rotation of the water-stirring blades 19.

When in actual use, the water-stirring lantern comprises the bottle body 1, the sealing cover 4, two snowflake rotating pieces, and the driving assembly disposed at the bottom end of the sealing cover 4. The two snowflake rotating pieces are symmetrically disposed on two sides of the connecting shafts 23, and are disposed in an internal space defined by the bottle body 1 and the sealing cover 4. The protruding blocks 3 around the notch portion 2 of the bottom end of the bottle body 1 are respectively snapped in the snapping grooves 5 defined in the sealing cover 4, which is convenient for disassembling and assembling the bottle body 1 and the sealing cover 4. The two snowflake rotating pieces that are symmetrically disposed are located at the upper end of the fixed bottom support base 12. The sleeve 9 disposed on the bottom end of the fixed bottom support base 12 is sleeved on the sleeving piece 18. The water-stirring blades 19 are installed on the sleeving piece 18 and are disposed on the driving shaft 16 and driven by the driving motor 15, thereby realizing the rotation of the water stirring blades 19. Water in the sleeve is stirred by the water-stirring blades 19 to change the water flow direction, so that the water flowing out of the water outlet 11 defined in the one end of the water outlet pipe 10 pushes the first snowflake rotating piece 13 and the second snowflake rotating piece 25, thereby realizing the rotations of the first snowflake rotating piece 13 and the second snowflake rotating piece 25. The water-stirring lantern is simple and convenient in design, is convenient to disassemble and assemble, and is suitable for popularization and application.

It should be understood in the description of the present disclosure that terms such as “top”, “bottom”, “one side”, “the other side”, :front”, “rear”, “middle”, “interior”, “upper”, “lower” etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

Terms such as “first”, “second”, and “third” are only used for the purpose of description, rather than being understood to indicate or imply relative importance or hint the number of indicated technical features. In addition, unless otherwise regulated and defined, terms such as “installation”, “bonded”, and “connection” shall be understood in broad sense, and for example, may refer to fixed connection or detachable connection or integral connection; may refer to mechanical connection or electrical connection, and may refer to direct connection or indirect connection through an intermediate medium or inner communication of two elements. For those of ordinary skill in the art, the meanings of the above terms in the present disclosure may be understood according to concrete conditions.

It should be noted that above description is optional embodiments of the present disclosure, but not to limit the present disclosure. Although the present disclosure has been described in detail with reference to the foregoing embodiments, it should be understood that those of ordinary skill in the art are still able to modify the technical solutions described in the foregoing embodiments, or equivalently replace some of the technical features in the foregoing embodiments, and these modifications or replacements do not deviate from spirit and principle of the present disclosure, which shall be included in the protection scope of the present disclosure.

What is claimed is:

1. A water-stirring lantern capable of freely changing a water flow direction therein, comprising: a bottle body;

wherein a sealing cover is installed on a bottom end of the bottle body; a first groove is defined in the bottom end of the sealing cover; a driving assembly is installed in the first groove; the driving assembly is disposed in a sleeve; a water outlet pipe is installed on one side of the sleeve; a fixed bottom support base is fixedly installed on an upper end of the sleeve; a connecting block is installed on an upper end of the fixed bottom support base; a first snowflake rotating piece and a second snowflake rotating piece are respectively installed at two side ends of the connecting block.

2. The water-stirring lantern according to claim 1, wherein the driving assembly comprises a driving motor; a driving shaft is installed on an output end of the driving motor; a sleeving piece is installed on the driving shaft; water-stirring blades are installed on the sleeving piece.

3. The water-stirring lantern according to claim 2, wherein a through hole is defined in a middle portion of the sleeving piece; the driving shaft passes through the through hole; a second groove is defined in the sleeving piece; a gasket is installed in the second groove; the sleeving piece is sleeved in the sealing cover.

4. The water-stirring lantern according to claim 1, wherein connecting shafts are fixedly installed on the two side ends of the connecting block; limiting blocks are respectively fixedly installed on the connecting shafts; mounting holes are respectively defined in the first snowflake rotating piece and the second snowflake rotating piece; a first connecting shaft passes through a first mounting hole in the first snowflake rotating piece; a second connecting shaft passes through a second through hole in the second snowflake rotating piece.

5. The water-stirring lantern according to claim 1, wherein inserting grooves are defined in the sealing cover; inserting rods are fixedly installed on two side ends of a bottom end of the fixed bottom support base; the inserting rods are respectively inserted into the inserting grooves in the sealing cover.

6. The water-stirring lantern according to claim 1, wherein the water outlet pipe is communicated with the sleeve; one end of the water outlet pipe away from the sleeve defines a water outlet; the water outlet is communicated with an interior of the bottle body.

7. The water-stirring lantern according to claim 1, wherein a notch portion is defined on the bottom end of the bottle body; protruding blocks are circumferentially disposed around the notch portion; snapping grooves are circumferentially defined in the sealing cover; the protruding blocks around the notch portion are respectively snapped in the snapping grooves of the sealing cover.

8. The water-stirring lantern according to claim 1, wherein a water inlet is defined in the bottom end of the sealing cover, and the water inlet is communicated with the bottle body.

* * * * *